United States Patent [19]

Jacobellis

[11] 4,427,028

[45] Jan. 24, 1984

[54] RESISTANCE WELDED ACCUMULATOR DEVICE

[75] Inventor: Alfonse A. Jacobellis, Woodland Hills, Calif.

[73] Assignee: VSI Corporation, Pasadena, Calif.

[21] Appl. No.: 332,456

[22] Filed: Dec. 21, 1981

Related U.S. Application Data

[63] Continuation-in-part of Ser. No. 250,833, Apr. 3, 1981, abandoned, which is a continuation-in-part of Ser. No. 93,041, Nov. 13, 1979, Pat. No. 4,280,533.

[51] Int. Cl.$^3$ .................... F16L 55/04

[52] U.S. Cl. .................... 138/30; 220/85 B; 228/184

[58] Field of Search .................... 138/30, 26; 220/85 B, 220/DIG. 29, 5 R, 3, 442, 466, 468, 359; 219/102, 92.2, 104, 105; 228/184

[56] References Cited

U.S. PATENT DOCUMENTS

| | | | |
|---|---|---|---|
| 2,205,251 | 6/1940 | Gillette | 220/DIG. 29 |
| 2,425,448 | 8/1947 | Weida | 220/359 X |
| 3,246,794 | 4/1966 | Marshall | 220/3 X |
| 3,500,866 | 3/1970 | Greer | 138/30 |
| 4,084,621 | 4/1978 | Sugimura et al. | 239/89 X |
| 4,143,678 | 3/1979 | Sugimura et al. | 220/85 B X |
| 4,181,156 | 1/1980 | Zahid | 138/30 |
| 4,299,254 | 11/1981 | Zahid | 138/30 |

FOREIGN PATENT DOCUMENTS

| | | | |
|---|---|---|---|
| 2009487 | 9/1970 | Fed. Rep. of Germany | 138/30 |

*Primary Examiner*—Charles E. Phillips
*Assistant Examiner*—Mark J. Thronson
*Attorney, Agent, or Firm*—Arthur B. Colvin

[57] ABSTRACT

The present invention is directed to an accumulator device and method of making the same characterized in that the bladder support member is connected to the body of the pressure vessel by a resistance weld between relatively thin gauge portions of the vessel and the bladder support, the device being so constructed and arranged as to be susceptible of operation under high pressures notwithstanding the thin pressure vessel section as a result of the reinforcing effects of a cap member secured over the open end of the accumulator.

5 Claims, 4 Drawing Figures

RESISTANCE WELDED ACCUMULATOR DEVICE

The application is a continuation-in-part of copending application Ser. No. 250,833, filed Apr. 3, 1981, now abandoned which is in turn a continuation-in-part of copending application Ser. No. 93,041, filed Nov. 13, 1979, now U.S. Pat. No. 4,280,533.

BACKGROUND OF THE INVENTION

1. Field of the Invention

The present invention is in the field of accumulator devices and relates to a method for making the same and to the resulting article.

2. The Prior Art

The present invention is directed to a hydraulic accumulator device of the type used in energy storage or pulsation dampening applications.

It is conventional in devices of the type described to form the pressure vessel of a shell or body component having an open mouth portion and a closed end carrying an oil port. The device includes a bladder assembly. The bladder assembly may be mounted within the vessel by connection of a sleeve or collar to the inner walls of the vessel, the lower ends of the sleeve or collar being secured to a thickened rim formed on the bladder.

Various modes or methods of assembly have been proposed, such modes or methods being disclosed, by way of example, in U.S. Pat. Nos. 3,397,719, 3,500,866, 3,654,964, 4,084,621 and also in pending U.S. applications Ser. Nos. 250,833 and 94,041, by the inventor hereof.

While resistance welding is a known procedure effectively employed to secure together abutting metallic members along a weld line, which also defines a seal, the use of resistance welding in the fabrication of hydraulic accumulators, and particularly accumulators intended to operate under high pressures, has heretofore been discouraged by the fact that resistance welds may efficiently be effected only between relatively thin metallic sections. Heretofore if the sectional thickness of the pressure vessel surrounding the bladder support skirt has been sufficiently thin to permit a resistance weld to be effected, the pressure handling capacities of the accumulator, due to the presence of such thin sections, have been reduced.

SUMMARY

The present invention is directed to an improved accumulator device and method of making the same which encompasses in a single apparatus the convenience and efficiency of a resistance weld connection between the bladder support and pressure vessel without compromising the burst strength resistance of the vessel proper. The improved result noted is achieved by providing an annular thinned section area on the shell of the pressure vessel adjacent the open end thereof.

The bladder assembly includes a skirt member which, in the inserted position within the vessel, includes portions aligned with the thinned section of the vessel. An annular resistance weld is effected in the area between the thinned section and the skirt, the weld securely locking the skirt in position within the vessel and forming a fluid-tight seal between the vessel and skirt.

After welding the skirt in position as aforesaid, a cap member is positioned over the open end of the vessel, the cap member including a depending skirt which extends over and beyond the thinned area of the vessel. A second weld connection is effected between the lower end of the skirt of the cap member and outer surface portion of the shell whereby it will be perceived that the thinned section is reinforced by the skirt of the cap member, providing a construction of high burst strength.

Accordingly, it is an object of the invention to provide an accumulator device having a high burst strength and yet permitting utilization of resistance welding techniques in the fabrication thereof.

A further object of the invention is the provision of a method of forming an accumulator of the type described.

Still a further object of the invention is the provision of a high burst strength accumulator characterized in that the outer surface of the pressure vessel includes an annular thinned section adjacent the open end thereof whereby an annular resistance weld may be effected between the thinned section and the bladder support member. The burst strength reduction which results from the provision of a thinned section necessary to the formation of the resistance weld is compensated for by the provision of a cap member which outwardly laps the reduced thickness section.

To attain these objects and such further object as may appear herein or be hereinafter pointed out, reference is made to the accompanying drawings, forming a part hereof, in which.

Figure 1:
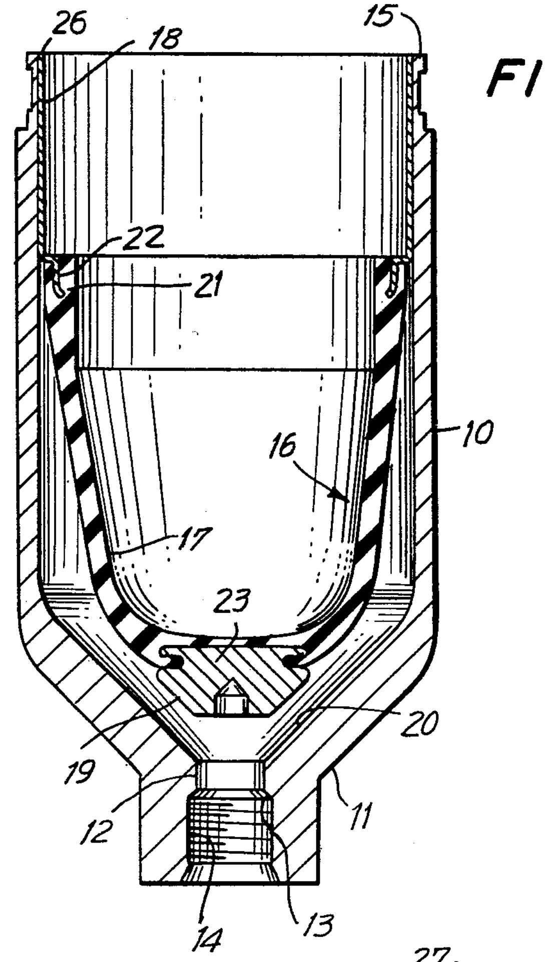
FIG. 1 is a vertical sectional view through an accumulator assembly showing the pressure vessel and bladder sub-assembly.
Figure 2:
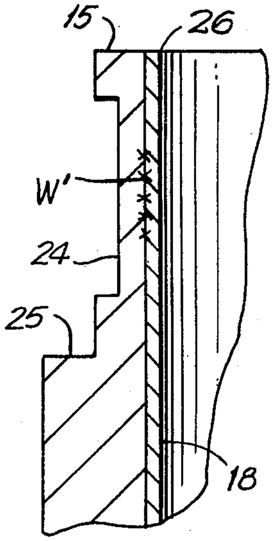
FIG. 2 is a magnified fragmentary vertical through upper components of the device section in an intermediate stage of construction.
Figure 3:
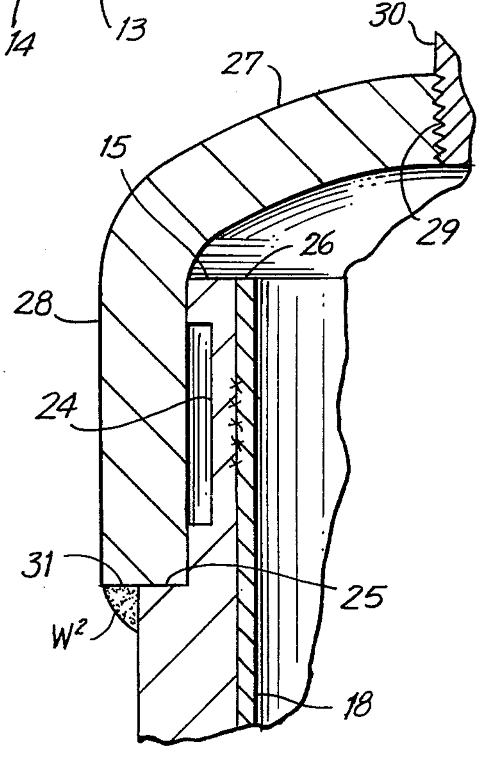
FIG. 3 is a section similar to FIG. 2, with the cap member in position.

Turning now to the drawings, there is shown in FIG. 1 a pressure vessel 10 having a closed end 11 formed with a through-going oil port 12. The vessel includes in its closed end a depending bore 13, internally threaded as at 14, for enabling connection of the oil port to a fitting of a hydraulic line.

The vessel 10 includes an open end 15 through which the bladder assembly 16, comprised of a bladder member 17 and a mounting skirt 18, may be positioned. The bladder 17 at its lower end may include a valve or button 23 having beveled side edges 19 corresponding in slope to the beveled area 20 surrounding the oil port 12.

As is conventional in the operation of hydraulic accumulator devices, when the bladder expands as a result of pressures within the bladder exceeding pressures in the conduit connected to the oil port, the areas 19, 20 are forced into engagement and close the oil port, the valve member 23 being sufficiently rigid to prevent extrusion of the bladder through the port 12.

The upper end of the bladder 17 includes a thickened rim 21 which is bonded to or molded in situ over bladder retainer portion 22 at the lower end of the skirt 18.

The outer wall portion of the pressure vessel 10 adjacent the mouth portion 15 of the vessel is recessed to define a thinned section 24 and an upwardly facing annular shoulder 25.

The bladder assembly 16 is mounted within the pressure vessel 10 by first advancing the bladder and skirt through open end 15 into the interior of the pressure vessel in such manner that the upper end 26 of the skirt 18 is in co-planar alignment with the mouth 15 of the vessel. Due to the thin gauge of the metal of the pressure vessel in the thinned section 24, it is possible to form a resistance weld W' between the skirt 18 and the metal of the pressure vessel in such thinned section area 24.

Formation of the resistance weld is effected by a procedure known per se and involves pressing a first electrode against the exposed inner face of the shirt 18 in registry with the thinned section area 24 and a second electrode against the outwardly directed exposed face of the thinned section 24. Pressure is applied to the electrodes and a welding current is caused to flow between the electrodes while the vessel is rotated bodily about its longitudinal axis, whereby a fusion is caused to occur between the skirt 18 and the thinned section 24, resulting in the provision of the annular weld connection W'.

As is known in the art, the procedures for formation of the weld W' will be varied in accordance with a number of factors, including the welding current, speed of rotation, thickness of metal sections, axial extent of the weld line formed, etc. Such factors are best determined on a trial and error basis.

In accordance with accepted resistance welding techniques, a weld of the nature shown is best formed where the metal sections joined are of approximately the same thickness.

As is readily apparent from an inspection of the figures, even the combined thickness of the skirt 18 and the thinned section 24 is substantially less than the thickness of the major portion of the pressure vessel 10. Accordingly, if a conventional cap assembly were applied, such thinner portions would provide a limiting factor as to burst resistance of the accumulator.

In accordance with applicant's invention, any compromising of burst resistance is corrected by or compensated for by the provision of a cap assembly 27 including depending skirt portion 28 which outwardly laps the thinned section 24.

The cap assembly includes a gas charging port 29 having a gas charging valve assembly 30 mounted therein. The depending skirt 28 includes an end portion 31 which, in the mounted position, lies in abutting relation with the shoulder 25 formed on the vessel.

A second annular weld connection W2 is formed between the end portion 31 and the outer surface of the shell 10 whereby the cap is securely mounted to the pressure vessel, and a second seal is defined.

The second annular weld W2 is formed by a conventional welding technique, the weld W2 preferably being axially displaced a sufficient distance from the rim 21 of the bladder such that overheating and consequent disintegration of the bladder components do not result from the welding operation.

While in the illustrated embodiment for purposes of clarity the thinned section 24 of the shell has been shown to be elongated in the axial direction, it will be readily recognized that the axial extent of such section need only be so long as to permit a weld to be effected.

Figure 4:
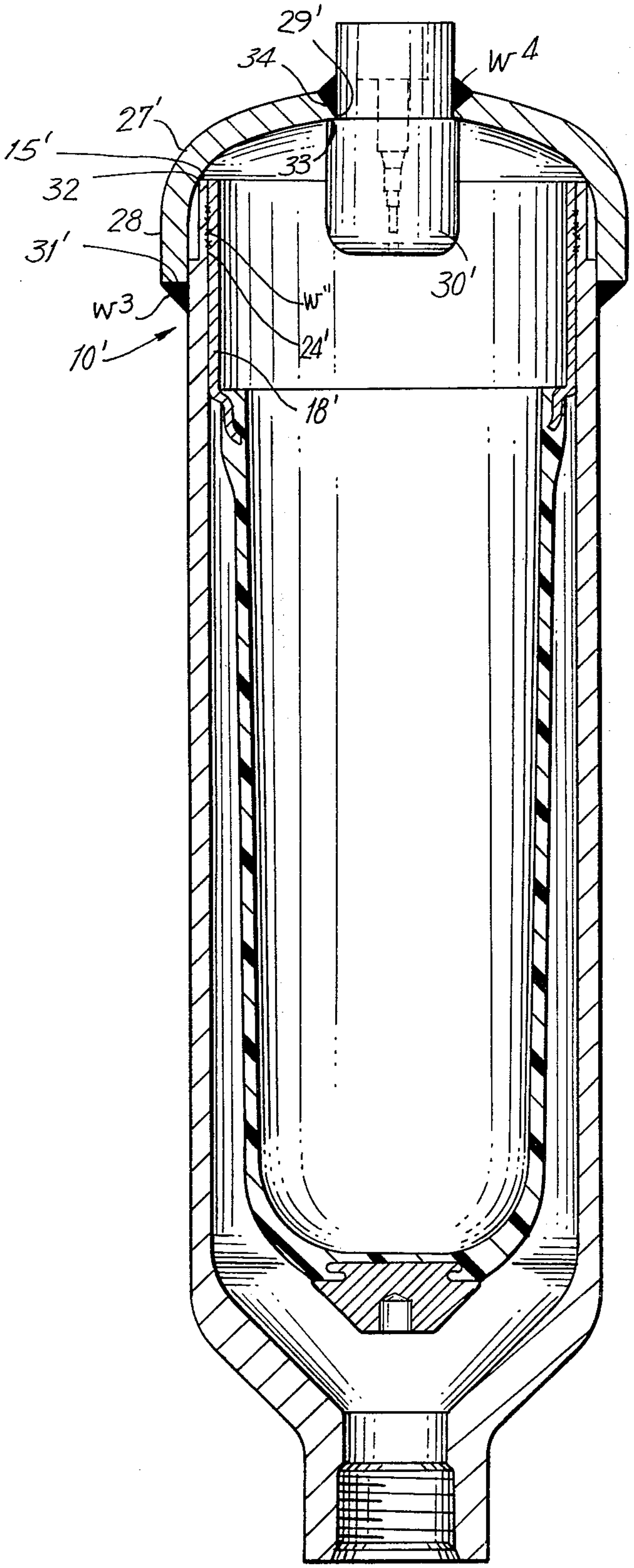
FIG. 4 is a fragmentary vertical sectional view similar to FIG. 3 depicting a preferred embodiment of the invention.

In FIG. 4 there is shown a preferred embodiment of the invention particularly useful in extremely high pressure applications. In the description of such embodiment like parts will be given like reference numerals.

In accordance with the embodiment of FIG. 4, the thinned section 24' extends to the upper end 15' of the vessel 10'. The resistance weld w'' is effected between shirt 18' and the thinned section 24' in the manner previously described.

Thereafter, the cap assembly 27' is sleeved over the upper end 15' of the vessel. It will be noted that the cap member is preferably moved axially of the vessel such as to achieve a metal to metal contact between the upper end 15' and the annular beveled portion 32 between cylindrical side wall 28 of the cap and the uppermost end of the cap.

In the embodiment of FIG. 4, the lowermost end 31' of the cap 27' extends beyond the thinned section 24' and into axial alignment with a full thickness section of the vessel 10'. Thus, when annular weld $w^3$ is effected between the end 31' and the outer wall of the vessel 10'. the weld material contacts the full thickness of the end 31' rather than only the partial thickness outside of the shoulder 25 (as in the prior embodiment) providing additional security against bursting of the shell.

In the embodiment of FIG. 4, the gas charging valve assembly 30' includes a radially directed annular shoulder 33 which abuts the inner surface of the cap 27' surrounding the port 29' to provide a more positive limitation against extrusion than the threaded connection of the prior embodiment. Preferably, the walls 34 surrounding port 29' are inwardly beveled and the area between the walls 34 and valve assembly 30' are provided with a full penetration weld $w^4$ to provide a high pressure resistant connection between the parts.

From the foregoing it will be observed that there is provided an accumulator device and method of making the same wherein the use of a resistance welding technique with its attendant efficiency and convenience is made possible without compromising the burst strength resistance of the accumulator in the area of the pressure vessel which has necessarily been thinned to permit the formation of the resistance weld.

Numerous variations in structural detail may occur to the skilled artisan in the light of the above disclosure. Accordingly, the invention is to be broadly construed within the scope of the appended claims.

Having thus described my invention, and illustrated its use, what I claim as new and desire to secure by Letters Patent of the United States is:

1. An accumulator device comprising a generally cylindrical pressure vessel including a first end and an open end, an oil port formed in said first end, an annular recess formed on an outer wall portion of said vessel adjacent said open end and defining a thinner tubular section, a bladder sub-assembly mounted in said open end, said sub-assembly comprising an axially elongated cylindrical metallic mounting skirt having a bladder fixedly secured to one end thereof, said skirt being disposed within said vessel with said one end nearest said first end, outer wall portions of said skirt intimately engaging inner wall portions of said vessel adjacent said open end in registry with said thinned section, a continuous annular, seal-forming resistance weld connection located between said skirt and said thinned section of said vessel, spaced from said open end, and contiguous with said thinned section, a cap member having a gas charging valve assembly mounted in closing relation of said open end of said vessel, said cap member including a depending skirt portion outwardly lapping the outer side wall portions of said vessel adjacent said open end including said thinned section, said skirt portion terminating in a depending end portion, and a second continuous weld connection formed between said end portion and said vessel.

2. Apparatus in accordance with claim 1 and including a stop shoulder formed on said outer wall portion of said vessel, said end portion of said cap member being in engagement with said stop shoulder.

3. Apparatus in accordance with claim 2 wherein said outer wall portion of said vessel adjacent said open end is of reduced diameter, said annular recess is disposed within said reduced diameter portion, and said stop shoulder is formed at the lower terminal end of said reduced diameter portion.

4. Apparatus in accordance with claim 1 wherein said annular recess extends to said open end, and said second weld engages substantially the entirety of said end portion of said cap.

5. Apparatus in accordance with claim 4 wherein said cap member includes a curved transition area in the portion between said skirt and said valve assembly, and said open end of said vessel is engaged against said transition area.

* * * * *